United States Patent [19]

Gier

[11] Patent Number: 4,469,347
[45] Date of Patent: Sep. 4, 1984

[54] ARTICULATED MULTIAXLE VEHICLE

[75] Inventor: Kurt Gier, Backnang, Fed. Rep. of Germany

[73] Assignee: Robert Schenk GmbH & Co. KG, Bissingen, Fed. Rep. of Germany

[21] Appl. No.: 294,060

[22] Filed: Aug. 18, 1981

[30] Foreign Application Priority Data

Aug. 23, 1980 [DE] Fed. Rep. of Germany ....... 3031862

[51] Int. Cl.³ .............................................. B62D 53/08
[52] U.S. Cl. .................................. 280/432; 280/446 B
[58] Field of Search ............... 280/428, 432, 474, 488, 280/424, 426, 446 B; 200/1 B, 14, 17 R, 17 A, 17 B, 1 R

[56] References Cited

U.S. PATENT DOCUMENTS

| 2,201,353 | 5/1940 | Soulis | 280/432 |
| 2,213,221 | 9/1940 | Johnson | 280/432 |
| 3,005,643 | 10/1961 | Dugan et al. | 280/432 |
| 3,093,713 | 6/1963 | Eadie | 200/14 |
| 3,328,051 | 6/1967 | Hope et al. | 280/432 |
| 3,580,610 | 5/1971 | Warren et al. | 280/432 |
| 4,065,148 | 12/1977 | Koroknay et al. | 280/432 |
| 4,313,616 | 2/1982 | Howard | 280/432 |
| 4,366,966 | 1/1983 | Ratsko et al. | 280/432 |

FOREIGN PATENT DOCUMENTS

| 847256 | 6/1952 | Fed. Rep. of Germany . |
| 1780578 | 3/1972 | Fed. Rep. of Germany . |
| 1780001 | 3/1975 | Fed. Rep. of Germany . |
| 2420203 | 7/1979 | Fed. Rep. of Germany . |
| 2810651 | 9/1979 | Fed. Rep. of Germany | 280/432 |
| 2919831 | 11/1980 | Fed. Rep. of Germany | 280/432 |

Primary Examiner—John A. Pekar
Assistant Examiner—D. Lynn Fugate
Attorney, Agent, or Firm—Craig & Burns

[57] ABSTRACT

An articulated vehicle with several axles, such as an articulated bus, is disclosed. The articulated vehicle comprises a primary car and a secondary car, a drive motor associated with the secondary car for driving at least an axle of the secondary car, and an articulated coupling connecting the secondary car with the primary car, the primary car having a front axle for steering the vehicle. A coupling brake is provided at the articulated coupling. the coupling brake is actuated in dependence on the jackknife angle between the primary car and the secondary car.

5 Claims, 5 Drawing Figures

ARTICULATED MULTIAXLE VEHICLE

The invention concerns an articulated multi-axle vehicle having a primary car and a secondary car where, by means of a driving engine assigned especially to said secondary car, at least the axle of said secondary car is driven, and where, by means of an articulated connection, said secondary car is connected with said primary car, in which case especially the front axle of said primary car steers the vehicle.

Articulated vehicles of this type are known as articulated buses. In this case, a ring mount is disposed between the primary car and the secondary car forming the pivoting point of the secondary car with respect to the primary car. In this zone, the vehicle bodies are laterally replaced by bellows means. Vehicles of this type encounter problems when a turn is being traversed, especially because of the fact that the secondary car forms a jackknife angle with the primary car. Therefore, the thrust forces of the secondary car, according to the bending angle, have a varying effect on the primary car along a tangent line imagined at the circle formed by the turn to be traversed. Without providing a special support between the primary car and the seconary car, this would lead to great impairment of the cornering characteristics of the primary car. It is, therefore, known in DOS German Unexamined Laid-Open Application No. 27 48 713 to affect the jackknife angle for an articulated vehicle by the fact that cylinders are disposed between the primary and the secondary car. These cylinders are biased in the direction of the stretched position of the articulated vehicle. With such damping cylinders, an unhindered jackknifing of the secondary car with respect to the primary car over a certain range is prevented because these cylinders, on account of their pretensioning, have a stabilizing effect, and especially in the case of fast, extensive jackknife motions, counteract the forces occurring during this process. However, through a hydraulic control of this type, blocking forces may affect the chassis of the vehicle body so that the damping means act essentially in the same direction as the thrust forces and, therefore, when they are acted upon, must compensate for the complete thrust forces. For this reason, it remains unavoidable that the damping means connected with the chassis transfer the forces also to said chassis and consequently to the vehicle body. Damping means of this type also cannot prevent the secondary car from carrying out lurching movements with respect to the primary car when narrow turns are traversed.

Articulated vehicles of the initially mentioned type are also known in DOS German Unexamined Laid-Open Application No. 24 20 203 where the motion of the whole vehicle eminates from the direction of the secondary car provided with the drive motion and developed as a trailer. In order to prevent the jackknifing of the articulated vehicle in that case, it is provided that, by means of a separate device, a maximally permissible jackknife angle is assigned to the respective steering angle. This jackknife angle is then compared with the actual jackknife angle and, as a function of the result of this comparison, an articulation blockage is, on the one side, caused to counteract the increase of the jackknife angle. In this case, it is assumed that only an articulation blockage can secure the vehicle and that the angle occurring in the articulation, in the case of a regular driving behavior, follows the steering angle indicated arbitrarily by the steered wheels with a certain time delay. For regular driving conditions, each steering angle can, therefore, be assigned a certain maximum jackknife angle. If this jackknife angle is exceeded, a blockage of the articulation is provided.

This type of construction has the disadvantage that expensive measuring devices for the steering and the bending angles, and also a computer and an electronics system must be provided. These, themselves, may be another source of error and also increase the expenditures. It is also a disadvantage that articulated buses developed in this manner may have difficulties when driving into parking spaces and when arriving at or leaving bus stops. In a case like this, where the steering turn never coincides with the assigned bending angle, the articulation would be blocked even though no reason would exist for such blockage. Another disadvantage is that, in the case of the known constructions, the blockage of the articulation takes place with a certain time delay which, even though it can be kept very low, in the case of certain road conditions, for example, in the case of a slippery road, can still not completely prevent the already occurring lateral slipping. The permissible driving speeds for such articulated buses are, therefore, relatively low.

In the case of semitrailers in German DE-AS No. 17 80 001, or also in the case of trailers of trucks in German DE-PS No. 847 256, brakes against lurching have also been provided which, on the one hand, are supposed to have the purpose of keeping torsional forces away from the so-called king pin (or central pivot) during the braking of the semitrailers. These brakes against lurching are triggered by the driver either through the brake pedal itself during the braking process or through a separate control switch. The same is true for brakes against lurching in the case of trailers, in which case the free rotating capacity of the pivoted bogie of the front-wheel support of the trailer can be braked arbitrarily. Both constructions have the disadvantage that the blocking brakes can be actuated only when the driver notices an excessive lurching of his trailer. Then measures taken may be too late.

In order to decrease the danger of lurching of trailers connected to passenger cars, it is finally also known in German Unexamined Laid-Open Application No. 17 80 578 to cause a dampening as a function of the angular deflection by a corresponding device provided at the trailer coupling. The device essentially consists of a blade which can be moved back and forth in a chamber that is acted upon by a pressure medium, where the blade goes along with the lurching movements of the trailer and is dampened in its movements by the fluid.

Such damping devices are known in the case of articulated vehicles of the initially mentioned type in the form of damping cylinders. However, they cannot have any effect on the initially mentioned problem of the jackknifing, especially of articulated buses, where the thrust takes place from the secondary car through articulation.

The present invention is, therefore, based on the objective of developing an articulated vehicle of the initially mentioned type by very simple means so that, even on a wet or slippery road and in narrow turns, it can be steered safely without the danger of a veering-off of the vehicle or a jackknifing between the secondary and the primary car.

The invention comprises an articulation brake provided which affects the articulated connection exclusively as a function of the jackknife angle between the primary and the secondary car and the braking force of which increases with increasing jackknife angles. The development according to the invention is, therefore, based on a different idea of preventing the jackknifing of an articulated vehicle than is the case in the known constructions.

In the case of the invention, the size of the steering angle is intentionally disregarded from the beginning, and it is provided that one concentrates and limits oneself directly to the articulation, in which case only the jackknifing angle existing therebetween the primary and the secondary car is taken as a measurement for the actuation of a brake which is disposed directly in the articulation. Therefore, no articulation blockage is provided as a function of an assignment of a steering angle and a jackknifing angle, but only a braking in the articulation is used that increases with an increasing bending angle. Because the invention for the control of the articulation brake requires only the size of the jackknifing angle itself and in this case carries out a successive increase of the rotating resistance in the articulation when the jackknifing angle increases, a relatively simple realization is achieved in constrast to the known arrangement. In addition, it was surprisingly shown that the driving behavior in the case of articulated buses is much better than that of the known, commercially available buses despite the more simple development of the control mechanism. By means of the development according to the invention, the thrust force component extending vertically to the longitudinal axis of the primary car, which increases with an increasing jackknife angle, by means of the increase of the braking force, is absorbed directly in the articulation, so that the disadvantages that can be expected on the basis of the thrust coming from the secondary car, when jackknifing angles occur between the primary car and the secondary car, and that affect the driving behavior, can be eliminated. It has been demonstrated that the articulated buses developed according to the invention, even when roads are icy, drive turns excellently so that their driving speed does not have to be limited to low values on the basis of safety regulations.

The articulation brake may, for example, be a pressure-medium actuated friction brake. Since articulated vehicles of this type are conventionally equipped with compressed-air aggregates, the articulation brake may be operated without an additional auxiliary energy system, for example, by means of compressed air. The arrangement of a friction brake in the area of the articulation can be carried out in a simple manner. Naturally, it is also possible to provide an oil-presssure-operated disk brake.

For the jackknifing-angle-dependent control, switches can be provided in a very simple manner which are firmly assigned to the primary or the secondary car and which can be operated by means of a step pulley assigned to the other car, with said switches controlling the compressed-air or pressure-medium supply to the articulation brake by means of solenoid valves. The angle-dependent control may also take place continuously electrically by means of a conventional potentiometer or it may take place by means of conventional throttles which are controlled as a function of the jackknifing angle. Finally, when the construction caused maximum jackknifing angle is reached, the service brake as well as the articulation brake may be acted upon by the switches so that, in this case, the braking also affects the vehicle. Damages that may be caused, when the angle is exceeded, on the body of the primary as well as the secondary car, may also be avoided.

In addition to the braking effect inhibiting the change in jackknife angle, anti-shimmy suspension means can be advantageously provided between the primary and secondary cars. These means are supported respectively against the opposite vehicle sides and being mountable at an angle to the longitudinal axis of the vehicle. These anti-shimmy suspension means have the advantage that they can damp a rolling motion of the secondary car during in-line driving. At the same time, the coupling brake means can thereby be controlled in such a way that it does not respond in case of small jackknife angle as they may occur, for example, due to rolling motions. This control during in-line driving could also be effected via a corresponding control of the coupling brake means of this invention, but a more comprehensive control would be required for such a purpose. A solution with the aid of the anti-shimmy suspension means, however, is entirely adequate for the small jackknife angles and represents the simpler possibility. The anti-shimmy suspension means can also be designed so that they effect blocking once a predetermined jackknife speed has been exceeded, so that further jackknifing of primary and secondary cars is avoided.

In order to render the cornering characteristic even safer, it is advantageous to install the tank and/or all other heavy auxiliary implements between the rear axle and the articulated coupling, in maximally close proximity to the coupling. Thereby the bearing load of the secondary car in the coupling can be higher. Rolling motions are thereby prevented and the coupling between the two vehicles is made safer.

The invention also opens up the possibility of applying to the coupling brake means at high driving speeds a partial braking pressure so that also in-line driving is stabilized.

In case of articulated buses of a large length, it is in some cases necessary, in view of keeping within the legally prescribed maximum curve radii, to also steer the axle or axles of the secondary car besides steering an axle of the primary car. In this connection, the arrangement of this invention offers the advantage that the coupling brake means can be equipped with a kingpin fixedly connected to the primary car via a mounting arm, which kingpin is necessary anyway for the coupling brake; and that this kingpin can be utilized, on the side facing away from the mounting arm, for attaching an operating arm for the control rod to the steered axles of the secondary car. This embodiment permits a space-saving arrangement wherein no difficulties arise regarding the accommodation of the coupling brake means, the shock absorbers, and the operating means for auxiliary steering unit at the secondary car.

The features of the invention will be explained in greater detail below with reference to the schematic representations shown in the figures by way of example, to wit:

Figure 1:
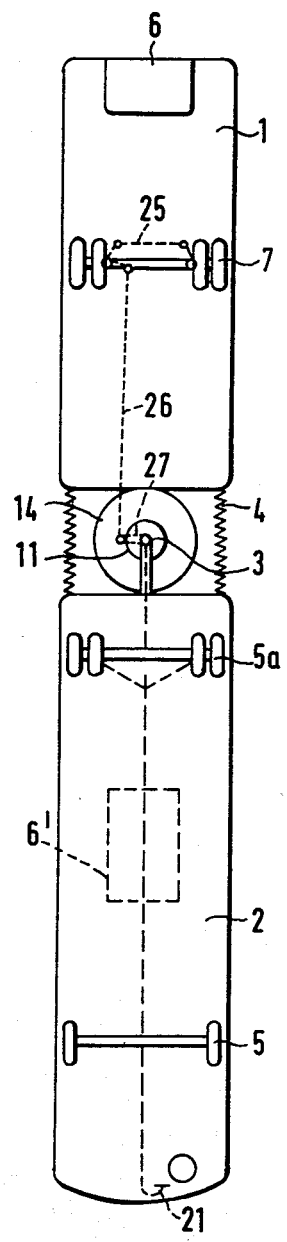
FIG. 1 shows a schematic illustration of a multiple-axle articulated bus during in-line driving.

FIG. 1 shows an articulated bus wherein 1 denotes a secondary car and 2 denotes a primary car, coupled together by way of an articulated coupling 3. In the illustrated example, the secondary car 1 carries the drive unit 6 and can be steered by the primary car via the steerable axle 5. The two cars are laterally joined by way of bellows 4 in the zone of the articulated coupling, as is the case with articulated buses, for example. Furthermore, such an articulated vehicle unit is customarily equipped with a foot brake 21 indicated only schematically in FIG. 1 for the axle 5a. The provision is made that such a foot brake 21 cooperates with the coupling brake means 11 arranged in the zone of the articulated coupling 3 in such a way that full load is applied to the coupling brake when the foot brake 21 is applied. It is also possible to provide the drive unit as a central motor 6' to drive the axle 5a. However, if the drive unit 6 is arranged in the secondary car, the load in the zone of the articulated coupling 3 becomes smaller.

Figure 2:
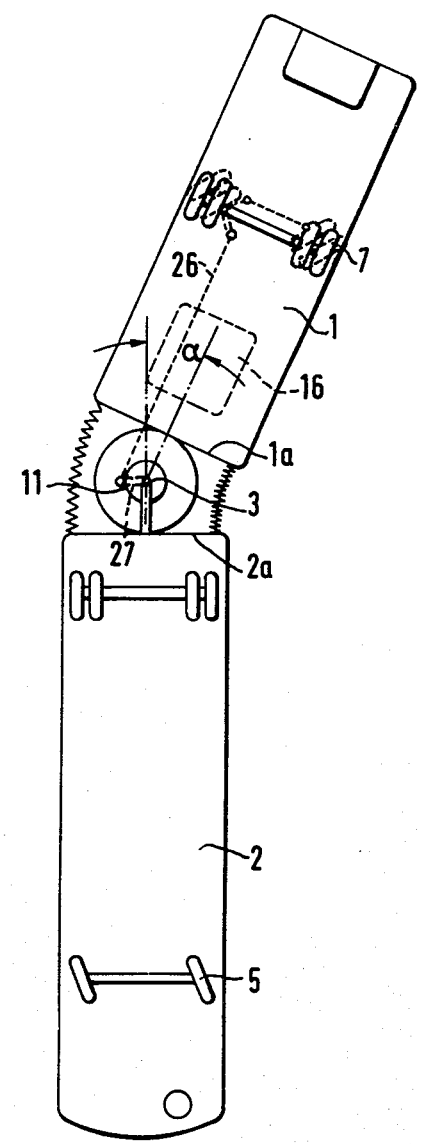
FIG. 2 shows a schematic view of a multiple-axle articulated bus while driving through a curve.

FIG. 2 shows such an articulated vehicle in a schematic view while driving through a curve. In this period, the secondary car 1 and the primary car 2 form a jackknife angle $\alpha$ with each other which is produced in dependence on the steering angle of the steering vehicle wheels 5. In this driving position, thrust forces occur at the primary car 2 stemming from the secondary car 1 and, in correspondence with a force parallelogram, are not completely effective in the direction of the longitudinal axis of the primary car 2. This fact is responsible for the problematic cornering characteristics of such articulated vehicles and can lead to the result that the secondary car forms a jackknife with respect to the primary car in case of a wet or slippery roadway. To prevent this from happening, shock absorbers are arranged in conventional types of construction between the opposed ends 1a and 2a of the two cars, so that these shock adsorbers act along the occurring force components. Thereby the full thrust forces must be absorbed by such shock absorbers, which forces are then further transmitted to the chassis and the car body whereby these parts are greatly stressed.

Figure 3:
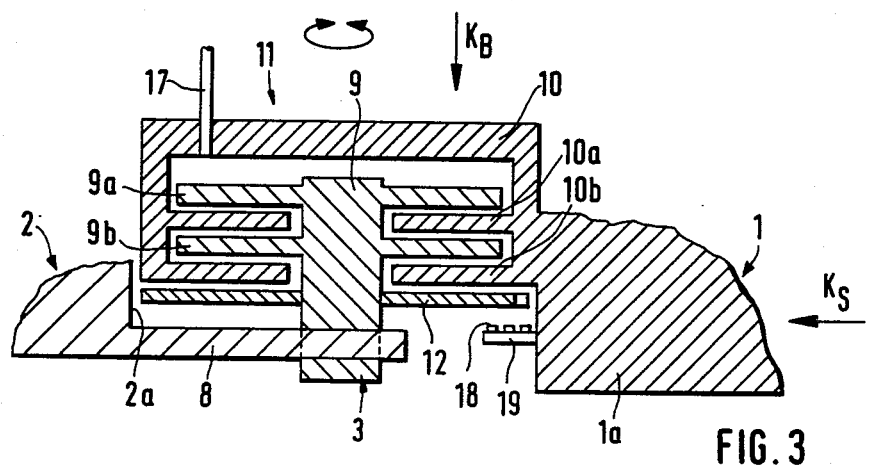
FIG. 3 shows a schematic view of a coupling brake arranged in accordance with the invention.

In order to overcome this deficiency, the provision is made in accordance with the invention to arrange a coupling brake means 11 in the articulated coupling 3 indicated in FIGS. 1 and 2 and shown schematically in FIG. 3. This brake is constructed, for example, in the manner of a pressure-medium-operated disk or multiple disk brake. The articulated coupling is established between the opposed ends 1a and 2a of the two cars 1 and 2 in such a way that a mounting arm 8, attached to the primary car 2, is nonrotationally connected with a kingpin 9 on which brake disks 9a and 9b can be provided. These brake disks can cooperate with brake surfaces 10a and 10b located on a brake housing 10, wherein the brake housing 10 and the brake surfaces 10a and 10b are fixedly connected to the other car, i.e. in this case with the secondary car 1. The coupling brake means can be, for example, a compressed-air-operated friction brake supplied in a manner not illustrated in detail via a compressed-air line 17 by one of the two cars, which also carries the compressed-air unit customarily provided in such articulated vehicles. The thus-produced braking forces $K_B$ of such a coupling brake means act perpendicularly to the thrust forces $K_S$ transmitted from one car to the other. The maintenance of a certain jackknife angle can then be carried out by the coupling brake means 11 with substantially lesser forces, wherein the coupling brake means can be controlled in such a way that it deploys an increasingly larger braking power with increasing jackknife angles. The occurring thrust forces of the secondary car 1 thus can no longer evoke any blocking forces which could exert a negative influence on the chassis and on the body.

Figure 4:
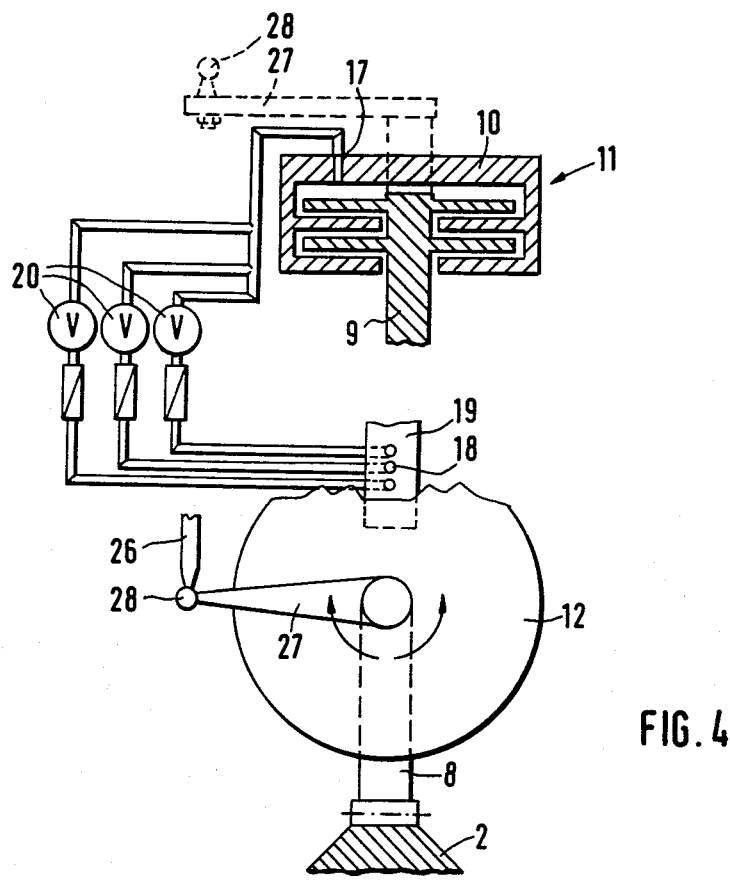
FIG. 4 shows a schematic view of a control switch.
Figure 5:
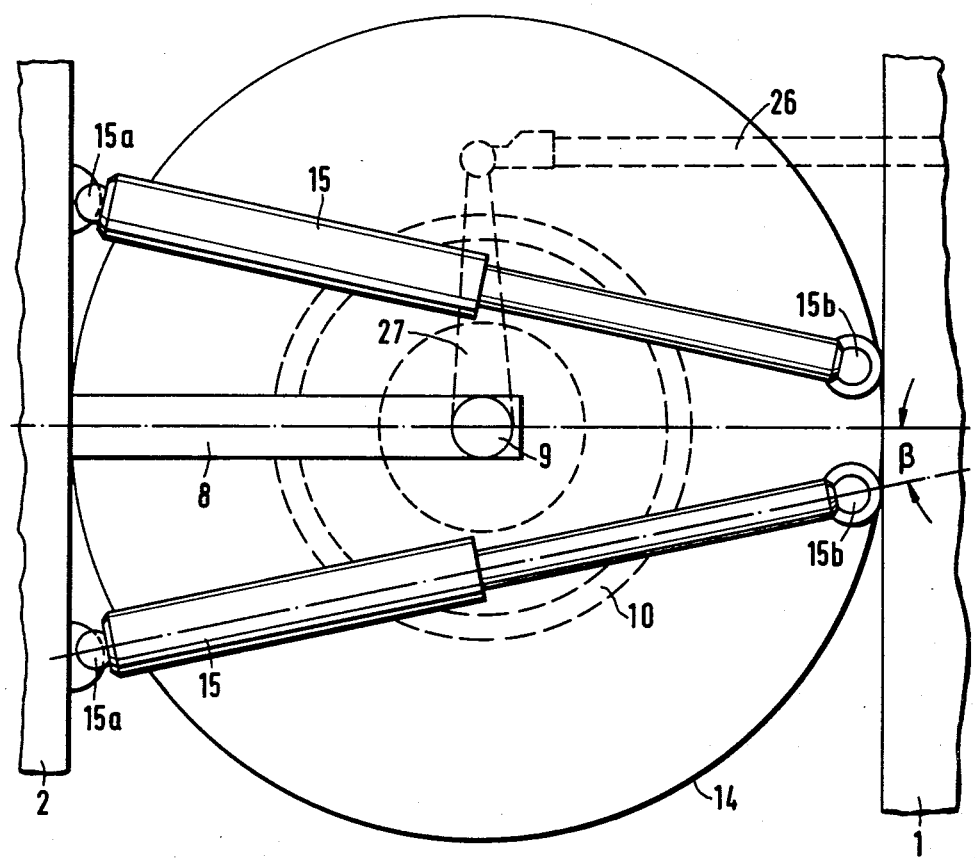
FIG. 5 shows a schematic view of the articulated coupling with anti-shimmy suspension means.

As shown in dashed lines in FIGS. 1 and 2 and in FIGS. 4 and 5, the kingpin 9, congruent in the embodiment with the coupling axis, can also be utilized for the purpose of carrying out the positive steerage of one axle 7—or several axles—of the secondary car. With an increasing total length of the articulated bus, it becomes necessary, with a view toward maintaining specific prescribed curve radii to concomitantly steer the axle 7 of the secondary car 1 as well as the axle 5 of the primary car 2. The axle 7 is steered via a steerable arrangement of the wheels of axle 7 and via a track rod 25 associated with these wheels, as well as via a control rod 26 leading to the primary car 2. The control rod 26 can, in this arrangement, be articulated in a very simple way to an operating arm 27 nonrotationally connected with the kingpin 9. Since this kingpin 9 is fixedly connected to the primary car 2 via the mounting arm 8, the wheels of the axle 7 are perforce participating in the steering operation while a curve is traversed (FIG. 2). Difficulties regarding space for accommodating the articulation of the control rod 26 at the primary car do not arise, although the coupling brake 11 and, as will be described below, a control device for the coupling brake 11 and shock absorbers 15 are arranged in the zone of the articulated coupling 3.

FIGS. 4 and 5 show that the kingpin 9 penetrates the brake housing 10 in the upward direction while maximally sealed off, and that the kingpin at this end, facing away from the mounting arm 8, is fixedly equipped with the operating arm 27 which latter can carry a ball and socket pin 28 for the articulation of the control rod 26.

The braking power can be controlled rather simply in dependence on the jackknife angle $\alpha$ by way of an actuating means comprising a stepped wheel or disk 12 shown in principle in FIG. 4 and being arranged, for example, in the zone of a ring mount 14 constituting the coupling between the primary car 2 and the secondary car 1. The stepped disk 12 is firmly joined to one of the two cars, for example the primary car 2, via the kingpin 9 fixedly arranged at this car. By means of this stepped disk, switches 18 responsive to the jackknife angle can then be operated in a simple way, these switches being arranged on a mounting 19 which, in turn, is fixedly connected, in a manner not shown in detail, with the other car, i.e. in this case the secondary car 1. The signals from switches 18 can then be transmitted to conventional solenoid valves 20 which can regulate the feed of compressed air via the supply line 17 into the coupling brake 11. Control is executed in such a way that the couping brake becomes ineffective in straight-ahead or in-line driving operation, and its braking power is raised with increasing jackknife angles by the procedure that the stepped disk, due to the switching of the switches 18 produced by rotary motion into one of the arrow directions, opens one solenoid valve 20 and, with enlarging angles, several solenoid valves 20, so that at maximum braking power the sum total of the pressures transmitted via the individual valves is present in the compressed air line 17 and acts on the brake. With a maximally predeterminable jackknife angle, the coupling brake can then have deployed its maximum braking power, whereby further jackknifing and thus an enlargement of the jackknife angle α between the two cars 1 and 2 can no longer take place. In this connection, this blocking step is executed in such a way that the secondary car 1 is no longer mechanically supported on the primary car 2 by way of shock absorbers which in this case are under maximum tension, but rather any further rotary motion in the coupling 3 proper is prevented by the actuated coupling brake means.

To render the control system simpler, the coupling brake can remain inactive within a certain, small angular range. The rolling motions of the secondary car 1 with respect to the primary car 2, which then occur during in-line driving, can be absorbed in a simple way via two anti-shimmy suspension means 15. The arrangement of the latter is shown schematically in the zone of the ring mount 14 in FIG. 5. They can be arranged, for example, above the coupling brake 11 in such a way that they are supported with one end 15a on one car, for example 2, and with the other end 15b on car 1. The anti-shimmy means 15 may be shock absorbers which are arranged in such a way that they form an angle β with the connecting axis of the two car halves 1 and 2. With an increasing jackknife angle, the couping brake 11 then increasingly takes over the damping functions. It is also advantageous if a partial brake pressure is produced in the coupling brake 11 at high driving speeds thereby contributing decisively toward stabilization while driving straight ahead.

Upon reaching the maximum jackknife angle, the control via the switch 18 can be executed in such a way that simultaneously the foot brake 21 is also acted upon. Accordingly, it becomes impossible for the maximum jackknife angle α to be exceeded thus avoiding damage to the chassis of the primary as well as secondary car.

An improvement in the cornering characteristics can also be achieved by mounting the tank 16, as shown schematically in FIG. 2, between the rear axle of the secondary car 1 and the coupling 3, in maximally close proximity to the coupling 3.

By means of the coupling brake, the cornering stability of articulated vehicles is considerably increased even on a wet and slippery roadway. Of course, a coupling brake operating according to this invention can also be advantageously utilized in couplings of other vehicles which are articulated together. Furthermore, by operating the coupling brake by way of the foot brake, a jackknifing of the secondary car with respect to the primary car can be effectively prevented during in-line driving as well as while traversing a curve.

While I have shown and described only several embodiments in accordance with the present invention, it is understood that the same is not limited thereto but is suceptible of numerous changes and modifications as would be known to those skilled in the art, given the present disclosure, I therefore do not wish to be limited to the details shown and described herein but intend to cover all such changes and modifications as are encompassed by the scope of the appended claims.

I claim:

1. An articulated multi-axle vehicle comprising a primary car and a secondary car, a drive motor associated with said secondary car for driving at least an axle of said secondary car, an articulated coupling connecting said secondary car with said primary car, the front axle of said primary car steering said vehicle, a coupling brake means being provided for acting on the articulated coupling exclusively as a function of a jackknifing angle between the primary and the secondary car, with the braking force of said brake means intensifying with increasing jackknifing angles.

2. The articulated multi-axle vehicle according to claim 1, wherein the coupling brake means is a pressure-medium operated friction brake.

3. The articulated multi-axle vehicle according to claim 1, wherein switches are provided for jackknifing-angle-dependent control, with said switches being fixedly connected to one of the cars and being operable by means of a stepped control disc connected to the other car, with said switches activating solenoid valves for controlling a compressed-air supply to the coupling brake means.

4. The articulated multi-axle vehicle according to claim 1, wherein, when a constructively caused maximum jackknifing angle is reached, a wheel brake as well as the coupling brake means are acted upon by means of switches.

5. The articulated multi-axle vehicle according to claim 1, wherein outer anti-shimmy means are connected to the coupling brake means between the primary vehicle and the secondary vehicle, with said outer anti-shimmy means supporting themselves in each case at opposite sides of the vehicle and being arranged at an angle to the longitudinal axis of the vehicle.

* * * * *